UNITED STATES PATENT OFFICE.

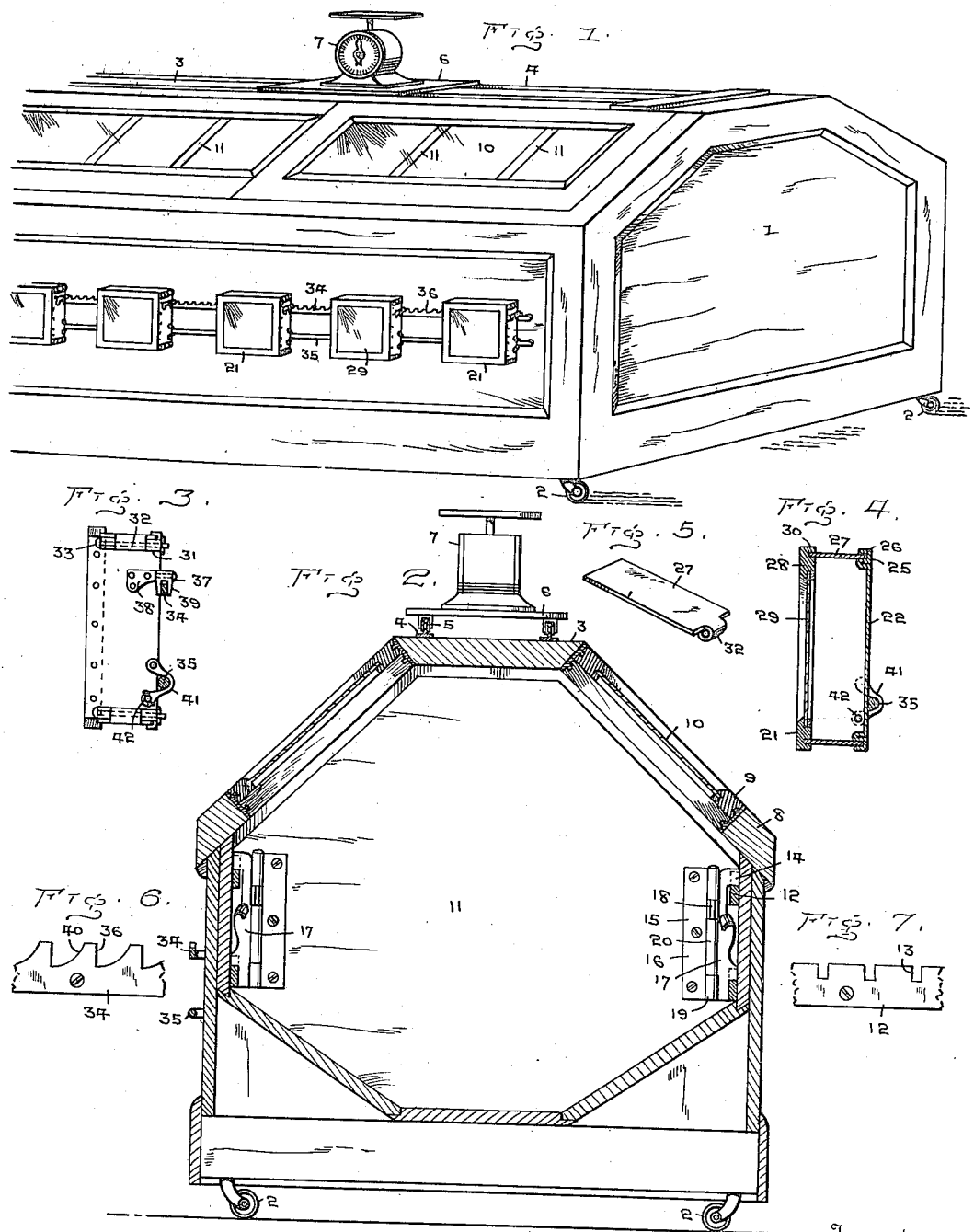

NICHOLAS JOHN SCHEPIS, OF COLUMBIA, LOUISIANA.

STORE-COUNTER.

1,215,873.    Specification of Letters Patent.    Patented Feb. 13, 1917.

Application filed January 20, 1916. Serial No. 73,164.

*To all whom it may concern:*

Be it known that I, NICHOLAS JOHN SCHEPIS, a citizen of the United States, residing at Columbia, in the parish of Caldwell and State of Louisiana, have invented certain new and useful Improvements in Store-Counters; and I do hereby declare the following to be a full, clear, and exact description of the invention, such as will enable others skilled in the art to which it appertains to make and use the same.

My invention relates to new and useful improvements in combined counters and bins of that class particularly adaptable for store use, and my object is to provide a structure, a portion of which will serve as a counter and the interior thereof, as a bin for the reception of various articles to be dispensed.

A further object is to provide sliding doors whereby access may be had to the interior of the bin structure from either side of the counter section.

A further object is to provide partitions, whereby the interior of the bin may be divided into compartments, said partitions having means thereon for engagement with parts of the bin for holding the partitions in their adjusted positions.

A further object is to provide a movable platform upon the counter section upon which are to be placed scales for weighing the contents of the bin.

A further object is to provide a plurality of receptacles adapted to contain samples of the articles within the bin.

And a further object is to provide means for adjustably mounting the receptacles exteriorly of the bin structure, so that they may be placed in registration with the compartment containing the article displayed in the receptacle.

Other objects and advantages will be hereinafter set forth and more particularly pointed out in the accompanying specification.

In the accompanying drawings which are made a part of this application,

Figure 1 is a detail perspective view of the combined counter and bin as applied to use, Fig. 2 is a vertical transverse sectional view thereof, Fig. 3 is an end elevation of one of the sample containing receptacles, Fig. 4 is a vertical transverse sectional view therethrough, Fig. 5 is a perspective view of one of the slides employed in connection with the receptacle, Fig. 6 is a detail elevation of one of the tracks employed for holding the receptacles in position upon the bin structure.

Fig. 7 is a detail elevation of a locking bar employed for holding the partitions in adjusted position, and Fig. 8 is a plan view of a portion of the sample containing receptacle in blank form.

Referring to the drawings in which similar reference numerals designate corresponding parts throughout the several views, 1 indicates the bin structure, the base portion of which is preferably mounted upon casters 2 whereby the bin structure may be moved from place to place as desired. The central portion of the upper wall of the bin structure is formed into a counter 3, said counter preferably having track ways 4 thereon for the reception of casters 5 of a platform 6, said platform being designed for the support of a pair of scales 7 so that the scales may be moved to any point upon the counter for weighing the product being dispensed from the bin. The remainder of the top sections of the bin structure, on opposite sides of the counter 3, are extended downwardly at an angle, said inclined sections forming frames 8 for the reception of sliding doors 9 whereby access may be had to the interior of the bin structure from either side of the counter, said doors preferably containing glass sections 10 through which the contents of the bin structure may be seen.

The interior of the bin structure may be divided into a plurality of compartments by the introduction of partitions 11 into the interior of the bin structure, said partitions being held in vertical and adjusted position by securing locking bars 12 to the inner faces of the side walls of the bin structure, said locking bars being arranged in pairs and having registering notches 13 in the upper edges thereof with which engage tongues 14 of a locking mechanism 15. The locking mechanism 15 is in the form of a hinge structure, the leaf 16 thereof being fixed to the face of the partition while the opposite leaf section 17 is hingedly secured to the leaf section 16 by introducing a bolt 18 through eyes 19 on the leaf section 16 and an eye 20 on the leaf section 17, the distance between the eyes 19 being greater than the height of the eye 20 so that the leaf section 17, which carries the tongues 14, may be moved vertically to disengage the tongues from the notches of the locking bars and then swung transversely in the arc of a circle to move the tongues out of engagement with the locking bars.

If desired to adjust the partitions, they may be moved vertically bodily so that the vertical movement of the rigid hinge sections 16 will raise the hinge section 17 and thus disengage the tongues 14 from the notches 13 of the bars 12, whereby the partitions may be readily moved lengthwise of the bin structure to the desired position and then lowered so that the tongues 14 will again engage the notches 13 to retain and hold the partitions in vertical adjusted position.

In order to exhibit a sample of the contents of each compartment within the bin structure a plurality of receptacles 21 are provided, the body portion 22 of each receptacle being preferably constructed of sheet metal and being blanked out as shown in Fig. 8 to form the end walls 23 and 24 and extensions 25 at the upper and lower edges of the body portion, said extensions being bent upon themselves to form guides 26 for one edge of the upper and lower slide plates 27. The front wall of each receptacle comprises a frame 28 containing a section of glass or other transparent material 29 through which the contents of the receptacle may be viewed, the inner, upper and lower edge walls of the frame 28 having grooves 30 formed therein for the reception of the opposite edges of the slide plates 27, the end walls 23 and 24 being engaged to the end edges of the frame 28.

The upper and lower edges of the end sections 24 are provided with extensions which are bent over to form registering loops 31, while one end of the upper and lower slide plates is provided with a loop 32 which is adapted to move into registration with the loops 31 so that by introducing a bolt 33 through said registering loops the upper and lower slide plates will be locked in closed position.

The receptacles 21 are adjustably attached to the side walls of the bin structure in view of the fact that it is necessary at times to move the receptacles to bring them into registration with the compartments within the bin structure and to this end, track bars 34 and 35 are attached to the exterior side walls of the bin structure 1 and spaced a distance therefrom, the lower track bar 35 being preferably circular in cross section, while the upper track bar 34 is preferably flat and provided with a plurality of notches 36 for the reception of a locking latch 37 pivotally mounted upon a shank 38 secured to one end of each receptacle, said latch being bifurcated to form fingers 39 which extend on opposite sides of the track bar 34 and in order to rotate the locking latch to move the fingers out of registration with the track bar 34, one edge wall 40 of each notch is curved or formed in the arc of a circle.

The lower portion of each receptacle 21 is slidably mounted upon the track bar 35 by introducing a clevis structure 41 around the track bar 35 at each end of the receptacle, one arm of each clevis structure being pivotally attached to the end walls of the receptacle, while the opposite ends of the clevis structures are attached to the end walls of the receptacle by introducing a rod 42 longitudinally through the receptacle and through the ends of the clevises. By attaching the clevises in this manner said clevises can be swung on their pivoted ends and readily introduced over the track bar 35 and secured thereover by bringing the free ends of the clevises into registration with each other and then introducing the rod 42 through said ends and the end walls of the receptacle.

When the partitions 11 have been properly positioned in the bin structure and the articles to be dispensed have been placed in the compartments formed by the partitions, a receptacle 21 is placed in registration with each compartment within the bin structure and is locked against casual displacement by swinging the latch 37 until the fingers thereof pass on opposite sides of the upper track bar 34, the body of the locking latch being entered in one of the notches 36 in said track bar. The bolt 33 at the upper edge of the compartment is then removed from the loops 31 and 32 and the upper slide plate 27 moved outwardly a predetermined distance when the receptacle is filled with the same class of commodity as contained within the compartment with which the receptacle is in registration. When the receptacle has been properly filled the slide plate 27 is returned to its initial inward position and locked to the remainder of the receptacle by the introduction of the bolt 33 through the loops 31 and 32. When the contents of the receptacle are to be removed, the lower slide plate 27 is operated similar to the upper slide plate thus permitting the contents of the receptacle to descend through the opening in the lower edge of the receptacle.

It will thus be seen that I have provided a convenient form of combined bin structure and counter and one that can be moved to any suitable point and occupy but a minimum amount of space.

It will likewise be seen that the interior of the bin structure can be readily divided into compartments of various areas and by disposing the sections of the upper wall of the bin structure on opposite sides of the counter at an angle and placing doors therein having glass sections, the contents of the bins may be readily viewed from either side of the bin structure.

And it will likewise be seen that by mounting the platform upon the counter in the manner shown, the scales employed for weighing the products contained within the bin structure may be readily moved from point to point upon the counter so as to bring the same in convenient position for weighing the class of merchandise being removed from the bin structure.

Having thus fully described my invention, what I claim as new and desire to secure by Letters Patent of the United States, is:—

1. The combination with a combined bin structure and counter, of a plurality of partitions designed to be adjusted lengthwise of the interior of the bin structure, a locking bar attached to each side wall of the structure and having notches in its upper edge, a locking mechanism at the side edges of each partition comprising a pair of leaf sections hinged together, one of said sections being vertically movable with respect to the other section, means to attach one of the sections to the partition, and a tongue on the vertically movable section adapted to engage the notches in the locking bar to hold the partition in vertical adjusted position.

2. The combination with a combined bin structure and counter, of a plurality of partitions adapted to be adjusted lengthwise of the interior of the bin structure, locking bars attached to each side wall of the bin structure and having notches in their upper edges, a locking mechanism at each side edge of the partition comprising a pair of leaf sections hinged together, one of said sections being vertically movable with respect to the other section and adapted to be swung transversely out of alinement with said locking bars, means to attach one of said sections to the partition, and tongues formed on the movable section adapted to engage the notches in the locking bars to hold the partitions in vertical adjusted position.

3. The combination with a bin structure and counter, of a plurality of partitions designed to be adjusted lengthwise of the interior of the bin structure, a locking bar attached to each side wall of the structure and having notches in its upper edge, a locking mechanism at the side edges of each partition comprising a pair of leaf sections hinged together, means to attach one of said sections to the partition, and a tongue on the other section adapted to engage the notches in the locking bar to hold the partition in vertical adjusted position.

In testimony whereof I have signed my name to this specification in the presence of two subscribing witnesses.

NICHOLAS JOHN SCHEPIS.

Witnesses:
J. H. McSween,
W. C. Welch.